United States Patent [19]
Paterson

[11] 4,431,318
[45] Feb. 14, 1984

[54] BEARING ASSEMBLIES

[76] Inventor: David R. Paterson, Unit 82, 6767 Thorold Stone Rd., Niagara Falls, Ontario, Canada

[21] Appl. No.: 335,568

[22] Filed: Dec. 29, 1981

[30] Foreign Application Priority Data

Dec. 30, 1980 [CA] Canada ................................ 367681

[51] Int. Cl.$^3$ ........................ F16C 17/04; F16C 19/30
[52] U.S. Cl. ...................................... 384/302; 308/215
[58] Field of Search ................... 308/207 R, 215, 231, 308/234; 384/302, 303, 420

[56] References Cited

U.S. PATENT DOCUMENTS

| | | | |
|---|---|---|---|
| 999,570 | 8/1911 | Lawson | 308/215 |
| 1,646,947 | 10/1923 | Armstrong | 308/215 |
| 1,917,452 | 7/1933 | Lott | 308/215 |
| 2,109,852 | 3/1938 | Scribner | 384/302 |
| 3,969,005 | 7/1976 | Traut | 308/215 X |

FOREIGN PATENT DOCUMENTS 1235828  6/1971  United Kingdom .

*Primary Examiner*—Stuart S. Levy
*Assistant Examiner*—David J. Werner
*Attorney, Agent, or Firm*—Young & Thompson

[57] ABSTRACT

Thrust bearing assembly comprising an outer shell (1) and an inner shaft (2) rotatable with respect to each other and having respective inner (3) and outer (4) surfaces defining therebetween an annular space in which is disposed a plurality of rollers, preferably under square, whose arcuate, outer end faces (10) have an overall curvature corresponding to the curvature of the inner surface (3) of the shell (1). In a preferred embodiment, each roller (5') has a bevelled, inner end face such that the rollers (5') form a continuous ring around the shaft (2') with bevels of adjacent rollers (5') in abutment. Also, the inner end face (11, 11') of each roller (5, 5') is preferably tangential to the outer surface (4, 4') of the shaft (2, 2'). The outer end faces (10,10') of the rollers (5,5') provide (i) increased resistance-to-wear characteristics, (ii) reduced scoring of the working surfaces of the shell and shaft, (iii) reduced working temperatures, and (iv) improved internal lubrication.

10 Claims, 6 Drawing Figures

BEARING ASSEMBLIES

DESCRIPTION

This invention relates to bearing assemblies and especially, but not exclusively, to thrust bearing assemblies in which the rollers are under square, that is to say, the diameter of each roller in the bearing is greater than its axial length.

In accordance with the invention, there is provided a bearing assembly comprising radially inner and outer members rotatable with respect to each other and having respective radially outer and inner surfaces defining therebetween an annular space and a plurality of rollers disposed in the annular space and each having an outer end face which is arcuate over at least a major portion thereof and whose overall curvature corresponds to the curvature of the radially inner surface of the outer member.

Preferably, each roller has a diameter greater than its axial length and in one preferred embodiment of thrust bearing assembly having such rollers, the inner end face of each roller is bevelled over a portion thereof, such that the rollers form a continuous ring around the inner member, with the bevels of adjacent rollers in abutment.

In order that the invention may be more fully understood, two preferred forms of thrust bearing assembly in accordance therewith will now be described by way of example and with reference to the accompanying drawings, in which.

Figure 1:
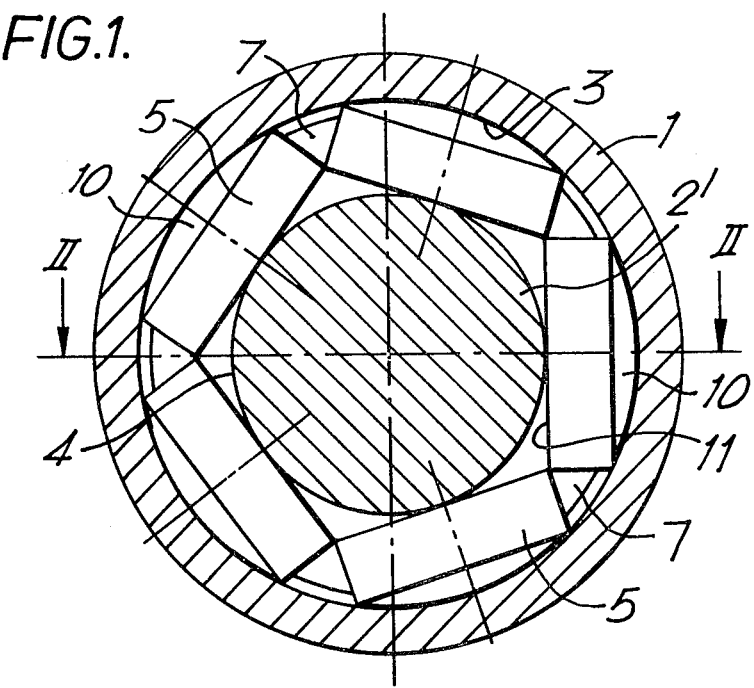
FIG. 1 is a transverse sectional view of a first form of thrust bearing assembly.
Figure 2:
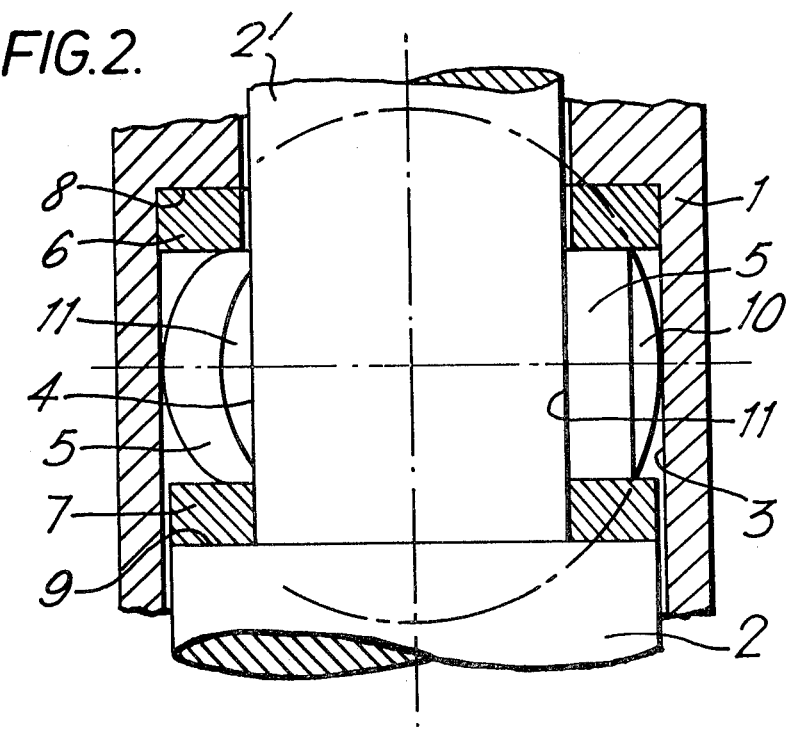
FIG. 2 is a section along the line II—II of FIG. 1.

Referring to the first form of thrust bearing assembly shown in FIGS. 1 and 2, an outer shell 1, through which extends coaxially a shaft 2, has a radially inner surface 3. A radially outer surface 4 of a shaft portion 2' defines with the radially inner surface 3 of the shell 1 an annular space in which is located a plurality, in this case five, of rollers 5. These rollers 5 are rotatably positioned in the annular gap between a pair of thrust washers 6, 7 of which one, that is, washer 6, abuts a shoulder 8 of the shell 1, adjacent an end opening of the shell through which the portion 2' of the shaft 2 extends. The other washer 7 abuts a shoulder 9 provided on a shaft 2.

A small inner annular gap is provided between the washer 6 and shaft portion 2', whilst a small outer annular gap is provided between the washer 7 and inner surface 3 of the shell 1.

Each roller 5 has an arcuate outer end face 10, directed radially outwardly of the bearing assembly, which has an overall radius of curvature which corresponds to that of the radially inner surface 3 of the shell 1. This radially outwardly directed end face 10 of each roller 5 engages the radially inner shell surface 3.

Each roller 5 has an inner end face 11 which is directed radially inwardly of the bearing assembly and engages the shaft portion 2' tangentially, Also, the inner circumferential edges of adjacent rollers 5 abut each other to provide a continuous ring around the shaft portion 2'.

Figure 3:
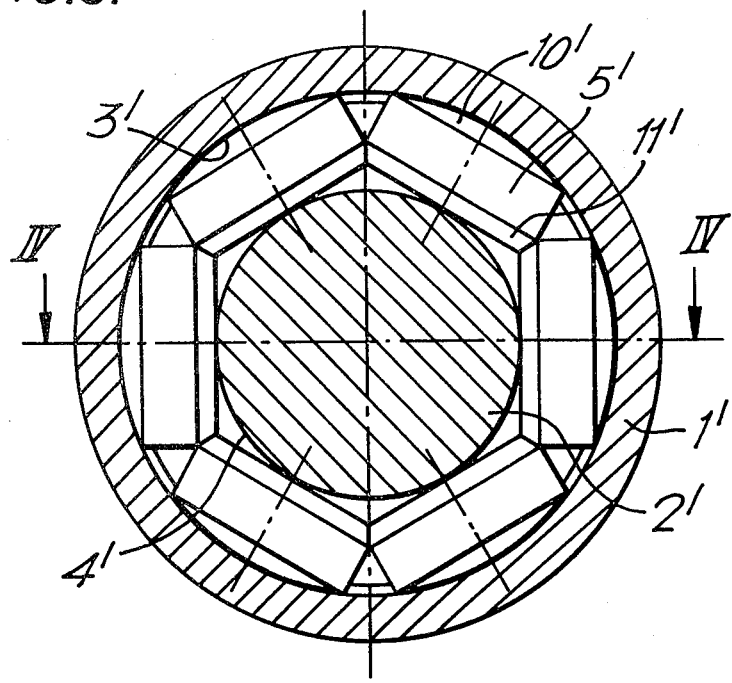
FIG. 3 is a transverse sectional view of another form of thrust bearing assembly.
Figure 4:
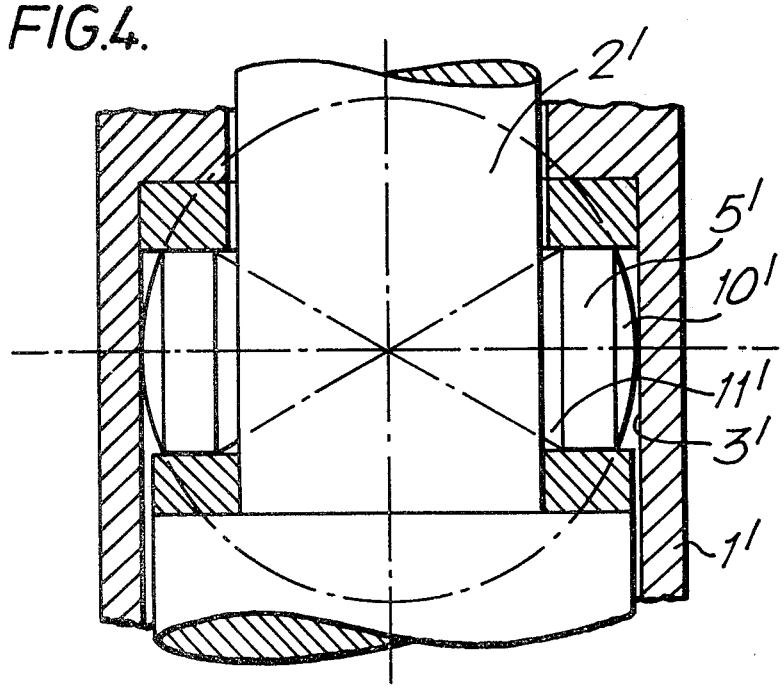
FIG. 4 is a section along the line IV—IV of FIG. 3.

Another form of thrust bearing assembly is shown in FIGS. 3 and 4, which is similar to that described above with reference to FIGS. 1 and 2. However, in this assembly there are six rollers 5' each having a bevelled inner end face 11', whereby the bevels of adjacent rollers 5' abut each other to form a continuous ring around the shaft portion 2'.

This bevelling of the inner end faces 11' of the rollers 5' provides improved resistance-to-wear characteristics over the bearing assembly described above with reference to FIGS. 1 and 2, although the provision of the outer end faces 10, 10' of each roller 5, 5', whose curvature corresponds to that of the inner surface 3, 3' of the shell 1, 1', attributes greatly improved resistance-to-wear characteristics over known forms of thrust bearings and assemblies.

Also, these curved, outer end faces 10, 10' of the rollers 5, 5' greatly reduce the tendency of the rollers to score not only the inner surface 3, 3' of the shell 1, 1' but also the outer surface 4, 4' of the shaft portion 2', as exhibited by previously known thrust bearings and assemblies.

Also, it has been found that the curved, outer end faces 10, 10' of the rollers 5, 5' reduce substantially the increase in the working temperature of the bearing assembly during use, as well as increasing the circulation of lubricant within the assembly, in cases where the assemblies are lubricated with, for instance, grease or oil. This improved lubrication is thought to be due to a form of shearing or dragging action provided by the line contact between the radiassed or curved, outer roller end surfaces 10, 10' and the corresponding inner shell surface 3, 3'.

Although all the bearing assemblies in accordance with the invention provide distinct advantages over known types of such assemblies, in that the outer end faces of the rollers are arcuate and have an overall curvature corresponding to that of the outer member or shell, the two preferred forms of assembly, as described above with reference to FIGS. 1 to 4, have been specially designed for applications where it is essential to have the maximum shaft diameter for a given overall assembly diameter or where it is necessary to keep the outside diameter of a thrust bearing assembly down to the very minimum.

The high performance provided by these bearing assemblies regarding both thrust rating and speed is largely brought about by the adoption of the under square rollers.

The advantage of using this type of under square roller are as follows:

(a) The roller diameter may be 3 or 4 times the cylindrical length of the roller, such that the rotational speed of the rollers is considerably less than it would be for a similar diameter bearing with square or over square rollers i.e. rollers with a diameter equal to or less than their length. The lower rotational speed of the former roller permits either a higher shaft speed or a higher thrust rating or both for the same stress conditions;

(b) by using rollers of relatively short axial extent it is possible to adopt a larger diameter roller for a given track width on the thrust race. The area of contact between the roller and thrust race is therefore considerably greater and provides a much higher load carrying capacity per roller;

(c) in all cases, where parallel rollers are used radially in thrust bearing assemblies, slippage must occur, since the track speed at one end of the roller will be different to that at the other end. This is more pronounced with a needle type or over a roller where the axial length is considerably greater than the diameter. It is less pronounced in the case of the roller whose diameter and axial extent are equal; and in the case of the roller whose axial extent is less than its diameter slippage is at a minimum. Slippage causes premature roller and track wear, as well as overheating; and (d) the axially sheet nature of the preferred type of roller enables the rollers to be guided much more effectively between the shaft and the inner surface of the outer casing. This dispenses with the need for a cage to guide the rollers. By obviating the need for a cage, the full length and width of the track on the thrust race can be taken up by using a full compliment of rollers.

The four factors (a) to (d) outlined above, namely, the reduction of roller speed, increase of roller diameter, reduction of roller slippage and the guidance of a full compliment of rollers without a cage, results in a thrust bearing assembly of exceptionally high performance for a given shaft diameter and overall bearing assembly diameter.

In order to sustain the high rating and overall performance of the preferred embodiments of thrust bearing assembly described above, it is important that the axis of each roller is controlled so that it is always radial to the centre line of the assembly. This condition is maintained by guiding the roller between the shaft and the inner surface of the casing. The inner end face of each roller is ground flat and is in contact with the outer surface of the shaft. The outer end face of the roller is ground to form a spherical segment of the same radius as that of the inner surface of the casing. The spherical contact between the outer end face of the roller and the inner surface of the casing is important. If, for example, the outer end face was flat, so that only the edges of the rollers made point contact with the inner surface of the casing, friction at these points would result. This would cause overheating but, most importantly, it would cause wear to the corners of the rollers and the inner surface of the casing. This would allow the rollers to slew around so that they would no longer be rolling in a radial manner. The rolling action would, therefore, be impaired, with the result that the rollers would be partially dragged sideways between the opposing thrust races.

Another advantage in having good contact, that is other than point contact, between the spherical outer end of the roller and the inner surface of the casing, is that it can allow an oil or lubricating film to build up between these faces, which leads to a further reduction of wear and overheating.

The inner end faces of the rollers of the embodiment described above with reference to FIGS. 3 and 4, have corners which are bevelled and which abut the bevels of adjacent rollers. These bevelled surfaces act as buffers between the rollers to provide an improved resistance to wear. The included angle of this bevel would be 360° divided by the number of rollers.

There are two main factors which affect the efficiency of the bearing assembly and, in particular, the guidance of the rollers around the thrust race or bearing track, these factors being:

(1) Roller Clearance

It is important to limit the clearance between the spherical, outer end face of the rollers and the inner surface of the assembly casing. If this clearance is not controlled, two conditions detrimental to the running of the assembly will arise.

(i) It will allow the rollers to twist or slew around so that they are no longer rolling in a radial manner. The rolling action will, therefore, be impaired, with the result that the rollers will be partially dragged sideways between the opposing thrust races.

(ii) If twisting of the rollers occurs, as described above, only the extreme edge of the spherical end face of the roller will be in contact with the inner surface of the casing. If this twisting is not limited, any oil film acting as a cushion on this face will break apart and will therefore no longer provide an efficient bearing surface for guiding the rollers.

(2) Roller Profile

Figure 5:
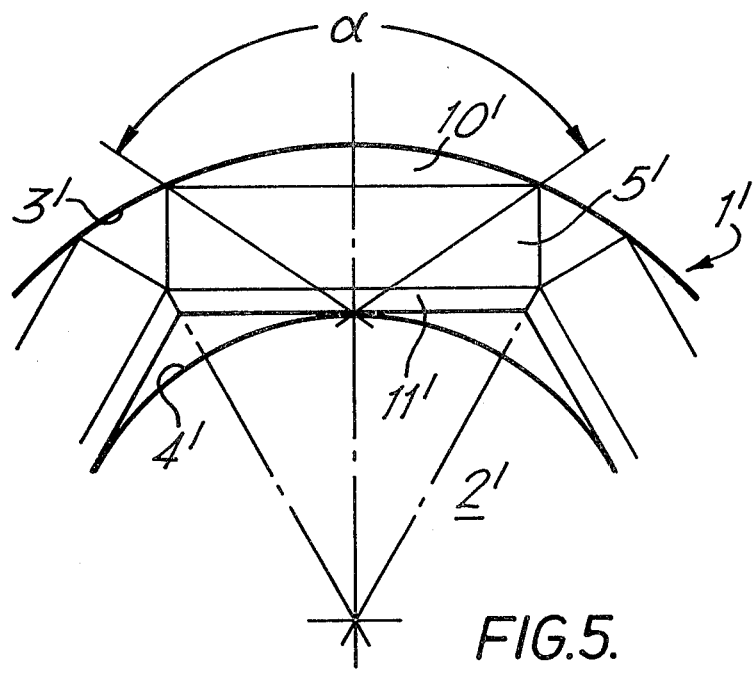
FIG. 5 is an enlarged, diagrammatic view of a portion of the assembly shown in FIG. 3.

Although the number of rollers for these preferred forms of thrust bearing assembly can vary, the most efficient roller profile is attained when the number of rollers per bearing assembly is either five or six. If the number of rollers is less than five, the chordal depth of the spherical radius becomes excessive, thereby causing a pronounced reduction of the effective track width for the rollers. As the number of rollers increases above six, guidance of the rollers becomes less efficient. The two bearing assemblies illustrated in FIGS. 1 to 4 show rollers 5, 5' whose diameters are three to four times the axial length of their cylindrical portions. This configuration provides a broad area of contact between the spherical outer end faces 10, 10' of the rollers 5, 5' and the inner surface 3, 3' of the casing 1, 1'. It also provides a large contact angle $\alpha$ as shown in FIG. 5, between the shaft 2, 2' and the inner surface of the casing, this included angle varying between 110° and 130°. This angle is important for the following reasons.

(a) To facilitate manufacture and for the basic functioning of the bearing, some measure of clearance on the spherical end face 10, 10' of the rollers must be allowed for and by adopting a contact angle $\alpha$ of approximately 120°, the twisting of the roller, resulting from the clearance between the spherical end face and the casing, will be much less pronounced than it would for a roller which is nearer to square in profile.

(b) In order to ensure that the bearing surface extends across the full extent of the spherical end face 10, 10' of each roller 5, 5' it is preferable to adopt a unilateral manufacturing tolerance for producing the spherical radius.

In this way, if there is any deviation in the size of the radius, the manufacturing limits can be adjusted so that there is a bias for the radius to be slightly larger instead of smaller. Under these circumstances, the chordal depth of the spherical outer end 10' can become shallower, resulting in a slight clearance between the central area of the spherical end of the rollers, and the inner surface 3' of the assembly casing 1'.

If a roller profile is adopted similar to that shown in the bearings described above, the tolerance on the spherical radius could be plus 5%. This would still limit the maximum clearance at the centre of the spherical end of the roller to one tenth of the tolerance of the radius. Therefore, in the majority of cases this clearance could be in the order of 0.025 mm which, assuming that a general purpose bearing oil is used, would still be small enough to support a continuous oil film.

(c) The rollers shown in FIGS. 1 to 4 will also be more effective in counteracting the twisting moment imparted to the roller by the rotation of the bearing under load. This twisting moment will be perpendicular to the plane of the roller axis or surface of the roller track.

A cylindrical roller will normally roll on a flat surface in a straight line. Any twisting moment is derived from the force applied to the spherical edge of the roller in order to change its direction of travel from that of a straight line to one which is curved around the circular path of the thrust race.

The force required to deflect the roller will depend upon the pressure of contact between the roller and the thrust race or track and the coefficient of friction. This coefficient of friction will not be for a rolling action but a dynamic sliding action. It will vary according to the diameter of the roller, the nature of the lubricant and the extent to which the lubricating film breaks down under load. Typical values for this type of friction for rollers running under normal loading conditions would be in most cases between 0.04 and 0.07.

Figure 6:
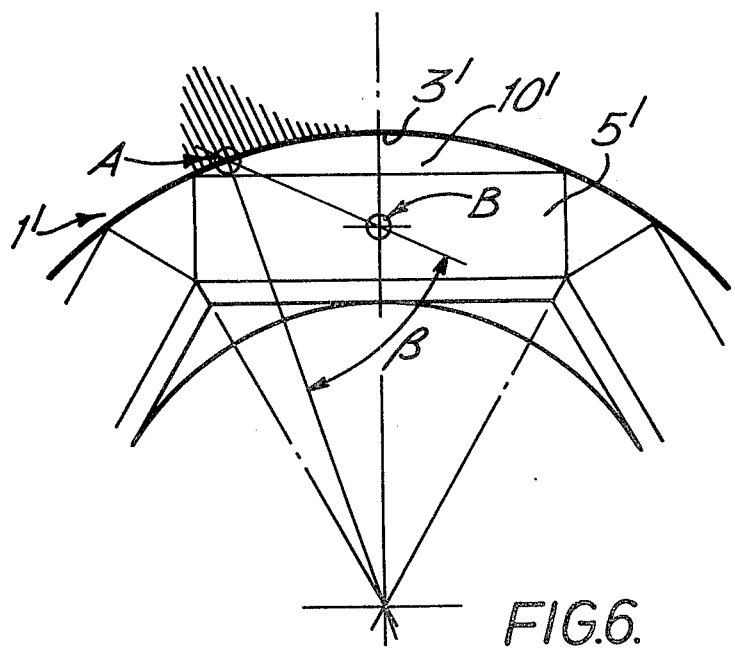
FIG. 6 is the same view as that shown in FIG. 5 but with various parameters included for the purpose of illustrating the advantageous features of the particular embodiment.

The twisting moment can be calculated by the following formula:

$$M = \frac{C_f T L}{2N}$$

where
M = Twisting Moment
$C_f$ = Coefficient of Sliding Friction
T = Total Thrust Load on Bearing
L = Cylindrical Length of Roller
N = Number of Rollers This twisting moment is restrained by the outer end face 10' coming into contact with the casing 1', as shown in FIG. 6.

The pressure created by the twisting moment on the end face 10' will depend upon the distance between a point of contact A and the centre point of contact B between the roller 5' and the thrust race.

It will also depend upon the angle of contact between a line intersecting points A and B and a line radial to the centre of the assembly also intersecting the contact point A. The angle between these two lines is shown as $\beta$ in FIG. 6. It will be apparent that, for a given twisting moment, the force radial or perpendicular to the inner surface 3' of the casing 1' at point A will vary in accordance with the magnitude of the angle $\beta$.

For example, if the angle $\beta$ is 90°, the force would be the twisting moment divided by the distance between contact points A and B. As in practice this angle is always less than 90°, the equation for calculating this force F is:

$$F = \frac{M}{D \sin \beta}$$

where
M = Twisting Moment
D = Distance between contact points A and B.

It should be noted that the contact point A is displaced slightly from the edge of the roller 5' since it represents the centre of pressure area of the spherical surface supported by the lubricating oil film.

(d) Rollers where the diameter of the roller is 3 to 4 times its axial length, will follow the curvature of the inner surface of the casing by contact between the spherical outer end of the roller and the casing alone. As the profile of the roller approaches this ratio, there is little or no direct reaction between the twisting moment of the roller and the shaft.

The clearance between the inner end face of the roller and the centre shaft is still important in order to provide a means of positive location. In theory, the rollers should all rotate and follow each other in the same identical manner. In practice creep occurs in the movement of the rollers and guidance from the shaft is, therefore, still necessary.

I claim:

1. A lubricated bearing assembly comprising radially inner and outer members rotatable with respect to each other and having respective radially outer and inner surfaces defining therebetween an annular space and a plurality of generally cylindrical rollers disposed in the annular space, with their axes extending radially with respect to the inner and outer members, and each having an axially outer end which is part spherical over the whole thereof, the overall radius of curvature of the axially outer end of each roller substantially matching the radius of the curvature of the radially inner surface of the outer member, each roller being in continuous line contact with the radially inner surface of the outer member along the arc subtended by the roller thereby to provide a relatively quiescent quantity of lubricant at the center of said part-spherical outer end of the roller.

2. An assembly according to claim 1, wherein each roller has a diameter greater than its axial length.

3. An assembly according to claim 1, wherein the rollers form a continuous ring around the radially outer surface of the inner member.

4. An assembly according to claim 1, wherein the axially inner end of each roller is bevelled.

5. An assembly according to claim 4, wherein the respective bevels of the axially inner ends of adjacent rollers abut each other.

6. An assembly according to claim 1, wherein the axially inner end of each roller is tangential to the outer surface of the inner member.

7. An assembly according to claim 1, wherein the axially outer end of each roller abuts the radially inner surface of the outer member.

8. An assembly according to claim 1, wherein the number of rollers is five.

9. An assembly according to claim 1, wherein the number of rollers is six.

10. A bearing assembly according to claim 2, in which the diameter of the roller is three to four times the axial length of its cylindrical portion.

* * * * *